US011149380B2

(12) United States Patent
Schott

(10) Patent No.: US 11,149,380 B2
(45) Date of Patent: Oct. 19, 2021

(54) METHOD FOR PRODUCING A KNITTED PART HAVING A COATING THEREON

(71) Applicant: medi GmbH & Co. KG, Bayreuth (DE)

(72) Inventor: Peter Schott, Bayreuth (DE)

(73) Assignee: MEDI GMBH & CO. KG, Bayreuth (DE)

( * ) Notice: Subject to any disclaimer, the term of this patent is extended or adjusted under 35 U.S.C. 154(b) by 239 days.

(21) Appl. No.: 16/392,883

(22) Filed: Apr. 24, 2019

(65) Prior Publication Data

US 2019/0330795 A1 Oct. 31, 2019

(30) Foreign Application Priority Data

Apr. 26, 2018 (EP) .................................. 18 169 547

(51) Int. Cl.

| | |
|---|---|
| ***D06N 3/00*** | (2006.01) |
| ***D06N 3/14*** | (2006.01) |
| ***D06N 3/18*** | (2006.01) |
| ***D04B 1/28*** | (2006.01) |
| ***B05C 3/02*** | (2006.01) |

(Continued)

(52) U.S. Cl.

CPC ......... *D06N 3/0093* (2013.01); *D06N 3/0009* (2013.01); *D06N 3/14* (2013.01); *D06N 3/183* (2013.01); *B05D 3/0254* (2013.01); *B05D 5/02* (2013.01); *B05D 2203/00* (2013.01); *B05D 2401/00* (2013.01); *B05D 2401/32* (2013.01); *D04B 1/28* (2013.01); *D06N 2203/068* (2013.01); *D06N 2205/10* (2013.01); *D06N 2209/106* (2013.01); *D06N 2211/103* (2013.01); *D06N 2211/106* (2013.01); *D06N 2213/03* (2013.01); *D10B 2501/041* (2013.01); *D10B 2501/043* (2013.01)

(58) Field of Classification Search

None

See application file for complete search history.

(56) References Cited

U.S. PATENT DOCUMENTS

RE22,167 E * 8/1942 Wells et al. ...... A41D 19/01547 2/161.8
2,962,384 A * 11/1960 Ljungbo ............... D06M 23/06 428/197

(Continued)

FOREIGN PATENT DOCUMENTS

DE 2533407 A1 2/1976
EP 0003845 A1 9/1979

(Continued)

OTHER PUBLICATIONS

European Search Report, EP18169547, dated Oct. 26, 2018.

(Continued)

*Primary Examiner* — William P Fletcher, III

(57) ABSTRACT

A method for producing a knitted fabric part which is knitted from at least one thread and which in one or a plurality of regions on the knitted fabric external side and/or the knitted fabric internal side is equipped with a coating, wherein, for configuring the coating, a material comprising free-flowing particles is applied in the region to the knitted fabric, said material subsequently being melted or fused by heating, whereupon the material is cooled while forming the coating.

12 Claims, 6 Drawing Sheets

(51) Int. Cl.
*B05D 5/02* (2006.01)
*B05D 3/02* (2006.01)

(56) References Cited

U.S. PATENT DOCUMENTS

| | | | | | |
|---|---|---|---|---|---|
| 3,682,738 | A * | 8/1972 | Smith | A41D 27/06 156/283 |
| 3,934,062 | A * | 1/1976 | Tillotson | A41D 19/0065 427/185 |
| 4,209,553 | A | 6/1980 | Greenberg | |
| 4,259,377 | A * | 3/1981 | Baize | B29D 99/0067 427/346 |
| 4,728,538 | A * | 3/1988 | Kaspar | D06M 17/06 118/202 |
| 5,230,944 | A | 7/1993 | Beer et al. | |
| 7,229,670 | B2 * | 6/2007 | Williams | A41D 19/01547 427/282 |
| 7,514,121 | B2 * | 4/2009 | Williams | A41D 19/0003 427/288 |
| 2002/0094376 | A1 * | 7/2002 | Hefele | B05C 1/0813 427/207.1 |
| 2002/0197924 | A1 * | 12/2002 | Halley | A41D 31/102 442/148 |
| 2010/0071115 | A1 * | 3/2010 | Sadato | D06M 15/59 2/243.1 |
| 2015/0133014 | A1 * | 5/2015 | Traser | C09J 175/06 442/64 |

FOREIGN PATENT DOCUMENTS

| | | | | |
|---|---|---|---|---|
| EP | 0520280 | A1 | 12/1992 | |
| EP | 0832953 | A2 * | 4/1998 | C08G 18/10 |
| FR | 2304471 | A1 | 10/1976 | |
| WO | WO-0063007 | A2 * | 10/2000 | A41D 31/102 |
| WO | WO-2019176949 | A1 * | 9/2019 | A41B 11/00 |

OTHER PUBLICATIONS

European Office Action dated Mar. 12, 2021 regarding the parallel Europe Patent Application No. 18169547.9, 9 pages.

Annex: McCordick. Glove & Safety Inc., Online Katalog: https://www.mccordick.com/userContent/documents/McCordick%20Glove%20&%20Safety%20Catalogue.pdf, 3 pages.

* cited by examiner

METHOD FOR PRODUCING A KNITTED PART HAVING A COATING THEREON

CROSS-REFERENCE TO RELATED APPLICATIONS

The present application claims priority of EP 18 169 547.9, filed Apr. 26, 2018, the priority of this application is hereby claimed and this application is incorporated herein by reference.

BACKGROUND OF THE INVENTION

The invention relates to a method for producing a knitted fabric part which is knitted from at least one thread and which in one or a plurality of regions on the knitted fabric external side and/or the knitted fabric internal side is equipped with a coating.

Knitted fabric parts having coatings, for example in the form of anti-slip installations, are known, for example in the form of gloves which, for example on the knitted fabric external side in the region of the palm of the hand or the fingers, are equipped with an anti-slip installation, or in the form of socks which, for example on the sole of the foot, are equipped with an anti-slip installation. Said anti-slip installations enable a better adhesion to be achieved by the knitted fabric part on a bearing face or a hard surface, so as to, for example be able to better grip an object with a glove, without the risk that said object slips through the glove, or so as to have an improved stance on the floor in the case of a sock.

To date, coatings of this type such as, for example, the anti-slip installations mentioned, have been applied in the form of relatively thick coverings, in most instances based on silicone, that are in most instances applied to the knitted fabric external side, said coverings usually being printed by the screen-printing method. These printed anti-slip zones mostly have a thickness from one to several millimeters, this resulting from the use of a relatively viscous material which after curing forms the elastic anti-slip installation. The cured material, without being sticky or acting in a sticky manner, has a correspondingly high adherence, thus it does not slip on the corresponding surface of the covering gripped or the covering forming the floor. While a functionally expedient anti-slip installation can herewith indeed be provided on the knitted fabric, said anti-slip installation is in most instances significantly thick and often unshapely, and on the other hand said anti-slip installation, by virtue of the large quantity of material applied to the knitted fabric, compromises the knitted fabric properties.

SUMMARY OF THE INVENTION

The invention is thus based on the object of specifying a method that is improved in relation to the above.

In the case of a method of the type mentioned at the outset, it is provided according to the invention in order for said object to be achieved that, for configuring the coating, a material comprising free-flowing particles is applied in the regions to the knitted fabric, said material subsequently being melted or fused by heating, whereupon the material is cooled while forming the coating.

In the case of the method according to the invention, a material comprising free-flowing particles or composed thereof, preferably in the form of a powder or a granulate, is applied in order for the coating, for example an anti-slip installation, to be configured. Said particles are deposited on the knitted fabric part which, depending on the type of knit, is knitted so as to be correspondingly dense or open. The application of the particles is performed only in the region in which the coating is to be configured. After the material has been applied, said material is heated such that the particles are melted or fused so that said particles establish a fixed connection to the knitted fabric, thus to the thread or threads, that is to say said particles are quasi fused to the thread or the threads. Depending on the application density of the particles, the particles can also adhere to one another and form a comparatively large covering layer. The particles, by being melted or fused, thus wet the thread or the knitted fabric, respectively, such that a fixed adhesion of the material on the thread, or on the knitted fabric, respectively, arises. The adhesive quality of the coating can be varied depending on the application density of the particles, as it can herewith be controlled how many particles ultimately form the anti-slip installation, thus consequently how large the area of the applied covering, thus the anti-slip covering, for example, is, or how contiguous the latter is, respectively. This means that the formation of thin coatings which, for example, have a sufficiently high adherence or grip or stiffness, respectively, is also possible herewith.

A powder or a granulate having a correspondingly fine grain is expediently used as the material. A fine powder or granulate when applied can readily also invade intermediate spaces between threads such that a certain proportion of free-flowing particles can also quasi be incorporated in the interior of the knitted fabric, and adhering also takes places therein when melting or fusing, wherein these adhesive particles are also in part or completely exposed and act in a grip-enhancing or adhesion-enhancing manner, for example, when the knitted fabric is inevitably elongated when worn.

According to one expedient first alternative of the invention, the free-flowing material can be applied in a quantity such that a planar coating which in the region connects the threads and forms the coating results. According to this alternative of the invention, relatively much free-flowing material is thus applied, such that a planar coating which connects or spans the individual threads of the neighboring loops results by way of the melting or fusing, said planar coating nevertheless being able to be embodied in a very thin manner in that the particles are not applied in any excessive quantity.

By contrast, a very expedient alternative provides that the particles of the free-flowing material while forming a thread coating are bonded only to the threads without connecting the latter. According to this alternative of the invention, so much, or so little, respectively, of free-flowing material is applied so that the individual particles only occupy, thus adhere to, the thread or the threads from which the knitted fabric is made, but do not connect the neighboring threads and thus the loops of the knitted fabric. This design embodiment of the invention is particularly expedient in that the inherent elastic properties of the knitted fabric are not or not significantly modified on account thereof. In the case of a planar coating described above, thus when the material quantity is high and a compact coating face which spans or connects the threads and loops is configured, the knitted fabric can correspondingly not elongate or deform, respectively, as in the absence of the coating. This is because the elasticity inherent in the knitted fabric is compromised or suppressed in the region of the coating, since the individual loops cannot move relative to one another. However, this is different in the case of the second alternative according to the invention, according to which only so much material is applied that only a thread coating results in the manner that the grip-enhancing or adhesion-enhancing particles by way of the fused bonding are indeed bonded to the thread or the individual loops, respectively, but do not connect the thread and the neighboring thread portion, or connect the loops among one another, respectively. The elastic properties of the knitted fabric are consequently preserved to the largest extent, since the loops can continue to move quasi relative to one another. This advantage is particularly expedient in particular in the case of compression knitwear, thus knitted fabric parts which have a particular, optionally also quantitatively standardized, compressive property, for example medical compression items or the like. Despite the application of the anti-slip installation in the form of the very thin thread coating, the compressive properties nevertheless remain almost uncompromised, but the compression item, thus the compression knitwear, in the respective region nevertheless has a sufficiently high adherence or grip.

A further advantage of said thread coating is that said thread coating is configured as only a very thin covering, since said thread coating is specifically incorporated in the knitted fabric so as to adhere only to the thread, or incorporated partially in the knitted fabric, respectively, that is to say that a very flat coating, which is barely visible but nevertheless is very advantageous in haptic terms, results.

The properties of the knitted fabric part can obviously be influenced directly by way of the applied coating. When the coating, or the material used, respectively, is an adherent, slightly sticky, respectively, material, a purely local or large-area anti-slip coating can thus be formed therewith. However, the use of a material which as a coating has only a minor elasticity is also conceivable, such that the elasticity of the knitted fabric per se on account thereof does not have any bearing, thus that the knitted fabric part locally or over a large area is relatively non-elastic, or limited in terms of elongation, respectively. On account thereof, so-called straps or tapes, for example, thus comparatively long narrow coating portions can be configured on the knitted fabric per se, for example on stockings or bandages, so as to by way thereof impart particular mechanical properties to the knitted fabric, for example for a pronation or a supination protection in the case of a stocking that for correcting the position of the foot encompasses the ankle. Depending on the material used, regions having dissimilar mechanical properties can thus be generated. The use of a dilatant material which varies the elastic properties thereof as a function of the elongation rate is also conceivable. When a tape-type strap-type coating from such a material on a stocking, for example, is very rapidly elongated such as is the case when twisting one's ankle, for example, the coating by virtue of the decreasing elasticity established on account of the rapid elongation can thus develop a blocking effect, consequently counteract the twisting movement, or stabilize the joint, respectively.

In a refinement of the invention it is conceivable that a plurality of tiers from dissimilar materials are applied, said materials for forming a multi-layered coating subsequently being melted or fused by collective heating, whereupon the material is cooled while forming the coating, or that a further tier from another material is applied to a first coating layer, said other material subsequently being melted or fused by heating, whereupon the other material is cooled while forming a further layer of the coating. Accordingly, the configuration of a coating in sandwich form is provided, thus a multi-layered coating, the tiers thereof being composed of dissimilar materials. The property of the coating in the entirety thereof can again be varied or set, respectively, by way of the material combination, or the mechanical properties of the various coating tiers, respectively. For example, the one layer can thus have or provide, respectively, a desired elasticity, while the other layer causes a limitation of the elasticity or elongation in the sense of a movement barrier.

The configuration of the sandwich coating can be performed in two ways. On the one hand, the coating can be generated in that two or more powder or granulate layers are applied on top of one another, whereupon the knitted fabric part, or the material layers, respectively, is/are collectively heated and melted or fused. Alternatively, a first coating layer can also be generated by applying and heating the powder or granulate, whereupon the second coating layer is generated in a like manner, and subsequently optionally a third coating layer, etc. The thermal implementation here is thus performed after each material application.

On account of such a sandwich construction, not only the configuration of the thin coatings is possible, but also the construction of thicker functional coatings, thus of coatings which are assigned a function resulting from the thickness thereof. Such a functional coating is, for example, a pad which can be configured in the manner according to the invention on a bandage or the like. To this end, a plurality of coating tiers from the same material or dissimilar materials are applied on top of one another until the desired thickness and optionally also the shape (slightly curved, for example) results. This functional element is fixedly connected, fused, to the knitted fabric. However, the configuration of comparatively thick holding or fastening portions to which a third-party item can be fastened, in particular fused, is also conceivable. For example, two mutually spaced-apart support coatings from a sufficiently rigid material can be up applied on a bandage to opposite sides along the bandage, the legs of a joint structure being able to be fastened, in particular fused, thereto, such that said legs can be fixedly and captively connected to the knitted fabric part and an orthosis results. Besides, the support coating can also serve for mounting a pad, for example likewise by fusing.

In one further design embodiment it can be provided that a second coating layer from a water-soluble material is applied in portions to a first coating layer, whereupon a third coating layer is applied to the first and the second coating layer. This is to enable two coating layers that lie on top of one another but are not connected to one another to be generated. A first coating layer is applied to the knitted fabric in the manner described. An intermediate layer from a water-soluble material is subsequently applied in portions to the first coating layer, said intermediate layer quasi serving as a barrier layer for a subsequently applied further coating layer which is bonded both to the first coating layer as well as to the water-soluble layer. When the knitted fabric part is now washed, the water-soluble layer is dissolved, and the two coating layers are separated from one another but are connected to one another at the ends thereof. Defined tape structures can thus be achieved.

The material per se is preferably sprinkled onto the knitted fabric part, to which end a corresponding sprinkling installation can be used from which the free-flowing material flows onto the knitted fabric situated thereunder, for example, or a material already applied or a coating layer already applied. In the case of a correspondingly set dispensing rate, very precise metering of the applied powder or granulate on the knitted fabric part, or the material, or the coating layer, respectively, can be set by way of said sprinkling device or, for example, the conveying time of the knitted fabric part moving therebelow.

The free-flowing material per se can be sprinkled only locally onto the knitted fabric external side or the knitted fabric internal side, or a material already applied, or a coating already applied; this means that regions are correspondingly equipped only in a punctiform manner with a coating, for example an anti-slip installation. In the case of a glove, this can be, for example, the region of the palm of the hand as well as the region of the internal side of the fingers. In the case of a sock, this can be, for example, the sole in regions, optionally also in a local manner the toes or similar. Depending on the field of application, or the design embodiment, respectively, of the knitted fabric part, a coating of the knitted fabric internal side is of course also conceivable, for example in the case of a sock in the region of the upper periphery such that the anti-slip installation there serves as an adhesive periphery which prevents the stocking from slipping, or the like. As an alternative to the only local application of the material which, of course, can also be applied in a plurality of individual mutually spaced apart regions, it is also conceivable that the knitted fabric external side or the knitted fabric internal side, or an already applied material, or an already applied coating, is completely sprinkled with the free-flowing material such that the coating is consequently configured across the entire knitted fabric external face or internal face. In this way, an improvement, for example of the adhesion or grip, in the case of an anti-slip coating can be performed over a very large area. This improved adhesion or improved grip is not uncomfortable under any circumstances, since the layer, or the adhesive covering, respectively, can be embodied so as to be very thin, as explained above, and consequently the adhesion or grip in terms of haptics can of course also be varied in a corresponding manner. For example, in the case of a stocking, the knitted fabric internal side can be populated over a large area or in a fully planar manner, wherein a layer that is as thin as possible is preferably generated only in the form of the thread coating. It is ensured on account thereof that the stocking cannot slip down, precisely since said stocking on the inside bears over a large area in a gripping manner on the leg; said gripping bearing at the same time in terms of haptics is not disadvantageous since only very little grip-facilitating or adhesion-facilitating covering is provided on the internal side. As set forth, other coatings having properties other than an anti-slip property are however also conceivable.

A template for delimiting the region or the regions is preferably used when sprinkling the material, this in a simple manner enabling the local application of the material in a precise manner.

The knitted fabric part for the application or sprinkling, respectively, can lie on a mesh, for example, and the material can be sprinkled from above, wherein material sprinkled laterally beside the knitted fabric part is collected below the mesh. In the case of a glove, for example, the glove lying on the mesh can be conveyed below the sprinkling installation by moving the mesh, the material flowing out of said sprinkling installation during the passing movement. The material which, for example, impacts the palm of the hand and the finger internal face, remains thereon, material flowing therebeside is collected below the mesh again, wherein suctioning of the material not sprinkled onto the knitted fabric part can be performed during said sprinkling so as to discharge said material immediately and directly, and to be able to also suction material which impacts, for example, in the peripheral region of the finger, where a coating, for example in the form of an anti-slip installation, is not desired.

The material, after being applied, is sufficiently heated such that melting or fusing arises, on account of which the adherence to the actual knitted fabric part is achieved, whereupon the material is cooled, this leading to the final configuration of the coating.

A thermoplastic or elastomeric polymer is preferably used as the material, wherein any polymer which after cooling imparts the desired properties to the coating, thus is still sufficiently flexible and elastic while simultaneously being sufficiently adherent, for example, can be used. A polymer in the form of a polyurethane is preferably used herein, this enumeration not being exhaustive. Such a polyurethane, for example, melts at a temperature around approx. 120° C., has a good wetting property such that a fixed bonding to the thread or the knitted fabric, respectively, is possible; said polyurethane simultaneously also has good grip properties and adhesive properties. When other properties than improved adhesive properties, for example a local stiffness or an elongation limitation, or the like, are to be imparted to the knitted fabric, corresponding polymers which in the melted state, while forming the coating, configure the desired coating properties, are used as the material.

The method according to the invention overall offers the application, for example, of a sufficiently thin coating, for example of a sufficiently thin anti-slip covering or adhesive covering which can partially also be integrated in the knitted fabric interior and can be embodied either as a quasi thin but compact coating or adhesive coating, or as a thread covering which does not connect the individual neighboring threads. Depending on the material used and the coating thickness, the force/elongation behavior or the corresponding elasticity properties of the knitted fabric are compromised to a far lesser extent, or not significantly, respectively, by this applied covering as compared to previously known very thick printed adhesive coatings, just as the main physiological properties are also modified only in a relatively minor manner, in particular when only very little material is sprinkled and a population of the threads arises. Besides, modifications of the force/elongation behavior can also be achieved to a large extent by way of relatively thin coatings, the elasticity properties of the knitted fabric consequently being heavily modified or reduced, respectively, in a local or global manner.

As has already been described, the knitted fabric part can be a glove which at least on the inner external side of one or a plurality of knitted finger portions is provided with the coating. Alternatively, the knitted fabric part can be a stocking which at least on the outside and/or inside on the sole and/or in the region of the upper open stocking end on the inside is provided with the coating. The knitted fabric part can also be a bandage which at least in portions on the internal side or on the external side is provided with the coating. This enumeration is not exhaustive but only exemplary and thus consequently not limiting.

The knitted fabric part per se can be a flat-knitted fabric or a circular-knitted fabric.

Besides the method, the invention furthermore relates to a knitted fabric part which is knitted from at least one, usually a plurality of threads, and which in one or a plurality of regions on the knitted fabric external side and/or the knitted fabric internal side is equipped with a coating, wherein said knitted fabric part according to the invention is produced by the method described above.

According to a first alternative of the invention, the knitted fabric part is furthermore distinguished in that the coating is configured either as a planar coating which in the region connects the threads and forms the coating. Alternatively, it is conceivable that the coating is configured as a thread coating which is bonded only to the threads and which does not connect the threads. In the case of this design embodiment, the individual fine-grain particles of the powder or of the granulate are consequently only bonded, thus fastened by way of the melting, on one thread and not simultaneously on two or a plurality of threads.

The coating per se is composed of a thermoplastic or elastomeric polymer, in particular a polyurethane.

This can be a glove which at least on the inner external side of one or a plurality of knitted finger portions is provided with the anti-slip installation. Alternatively, the knitted fabric part can also be a stocking which at least on the outside and/or the inside on the sole and/or in the region of the upper open stocking end on the inside is provided with the coating. The knitted fabric part can finally also be a bandage which at least in portions on the internal side is provided with the coating.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
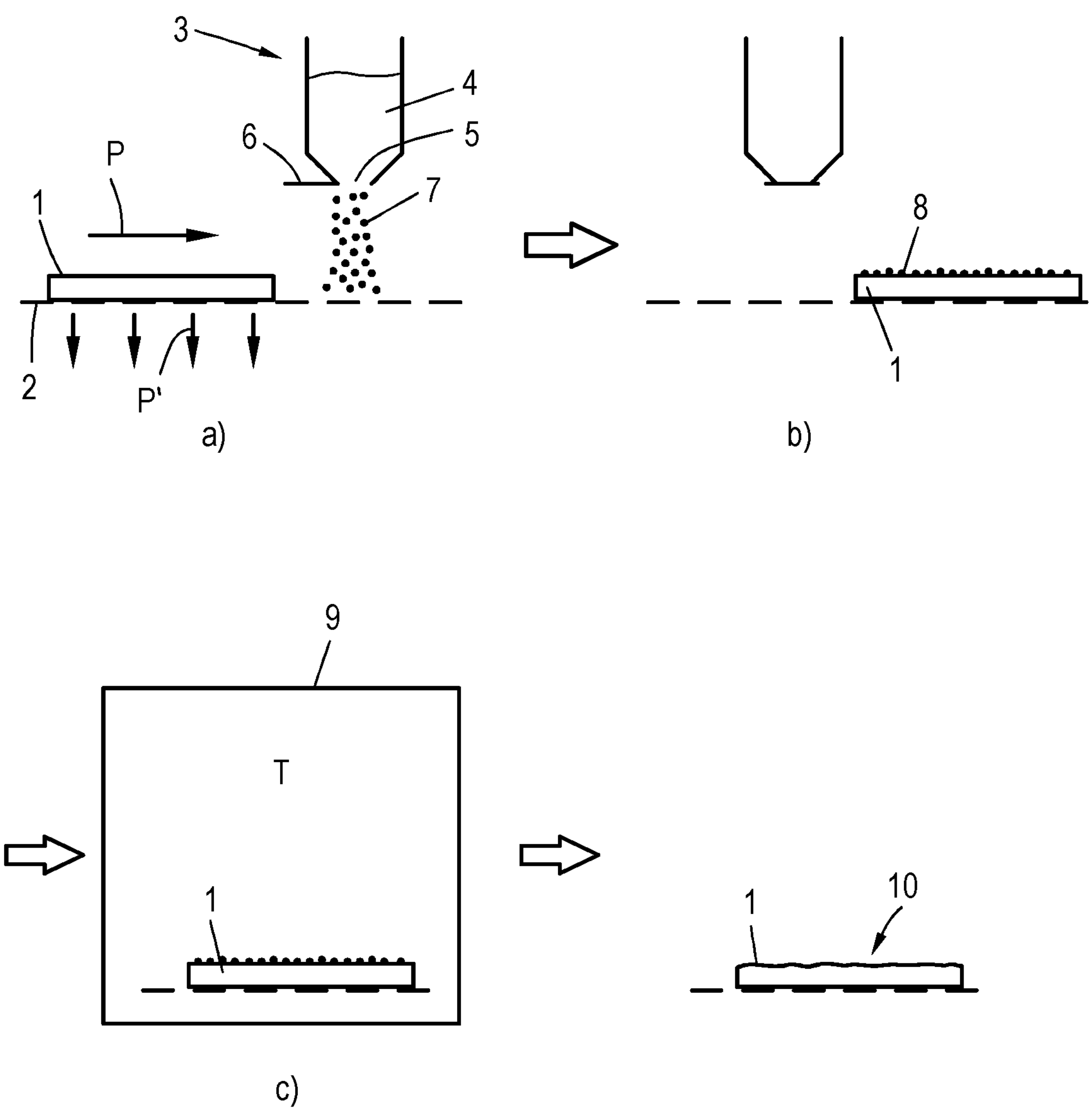
FIG. 1 shows a schematic diagram for explaining the method according to the invention.

FIG. 1 shows a schematic diagram for explaining the various method steps of the production method according to the invention. A respective knitted fabric part 1, for example a glove or similar, shown in the schematic diagram, lying on a mesh 2 is transported to a sprinkling installation 3 in which a material 4 composed of free-flowing particles is received. The free-flowing particles 7 flow downward by way of an opening 5 which is on the lower side and which by way of a closure installation 6 can be closed and opened in a reversible manner. The knitted fabric 1, as is illustrated by the arrow P, is conveyed to the sprinkling installation 3 and is conveyed below the latter such that the free-flowing particles are sprinkled onto the upper side of the knitted fabric part 1. The sprinkling procedure is facilitated by a suctioning system, as illustrated by the arrows P'; this means that particles not dropping onto the knitted fabric part 1 are simultaneously suctioned and can be recycled.

The knitted fabric part 1 after the termination of the sprinkling procedure, cf. sub-figure b), is provided with a very thin particle covering 8, wherein the individual particles 7 lie on the threads forming the knitted fabric part 1.

The knitted fabric part 1 sprinkled with the particles 7, cf. sub-figure c), is thereafter moved into an oven 9 where said knitted fabric part 1 is heated at a respective temperature until the particles 7 are melted or fused and, since said particles are slightly or completely fluid, they wet the threads of the knitted fabric part 1, or the knitted fabric part 1, respectively. After a respective dwell time has elapsed, the knitted fabric part 1 is retrieved from the oven 9 and is cooled such that said knitted fabric part 1 on the surface is provided with an anti-slip installation 10 formed from the particles 7 adhering to or fused to the knitted fabric part 1 or the threads thereof.

Depending on the size of the particles 7, or on the quantity in which said particles 7 are consumed, various design embodiments of the respective covating 10, for example in the form of an anti-slip installation, are conceivable.

Figure 2:
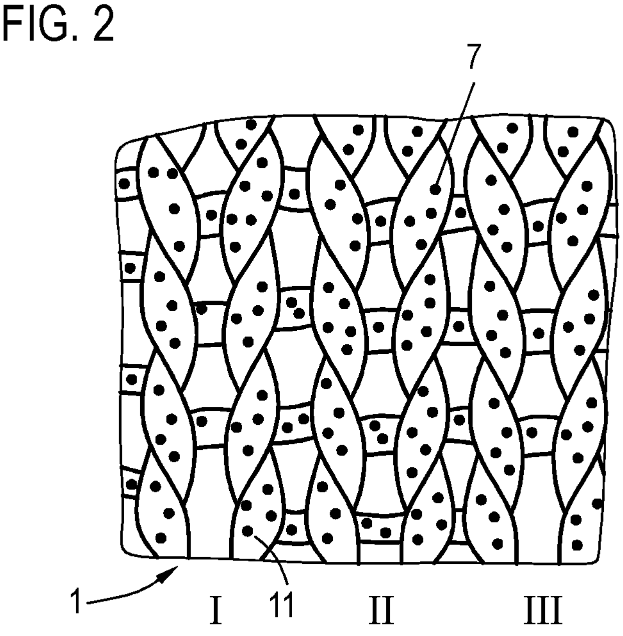
FIG. 2 shows a schematic diagram of part of a knitted fabric having free-flowing pulverulent particles applied thereto, prior to the thermal treatment.

FIG. 2 in the form of a schematic diagram shows a knitted fabric part 1 which in the example shown is knitted from one thread 11 which is knitted in a loop-forming manner. FIG. 2 shows the knitted fabric part 1 which is knitted from one thread 11, wherein the knitted fabric part 1 can of course also be knitted from a plurality of threads. The schematic diagram shows the knitted fabric part 1 immediately after the sprinkling of the material 5, wherein the free-flowing particles 7 here are pulverulent, thus very finely grained. The fine powder particles 7 can be seen lying on the thread 11. The degree of population is very minor, that is to say that the individual particles 7 lie so as to be quasi singularized, or at a very minor density, respectively, on the thread 11. At an increasing population, the particle count per thread would likewise increase, which would lead to a respective increase in the quantity of adhering coverage, or grip-promoting coverage.

Figure 3:
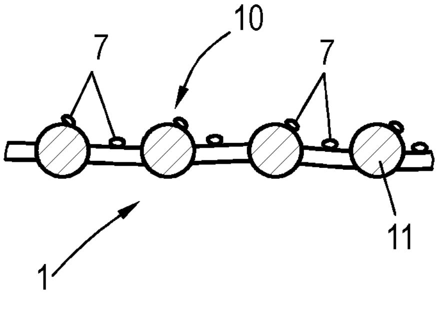
FIG. 3 shows a sectional view through the knitted fabric from FIG. 2, after the thermal treatment, as a schematic diagram.

The knitted fabric part 1 after the sprinkling of the particles 7 is heated such that said particles 7 are melted or fused, and subsequently cooled again such that the particles 7, or the material, respectively is solidified again. FIG. 3 shows a schematic diagram of a section through the knitted fabric part 1. As can be seen, the individual melted particles 7 are on the thread 1 only in a local manner, wherein the multiplicity of individual particles 7 result in the coating 10, for example the anti-slip coating 10, which is embodied here as a pure thread coating since the individual particles 7, or the individual grip points and/or adhesive points are provided only locally on the thread 11; said particles 7 are however not fused as a large-area coating which spans the threads of the neighboring stitch courses I, II, and III. The coating 10 produced on account thereof is thus extremely thin, partially interlinked in the knitted fabric part 1, and almost not visible in particular when a powder which in terms of color is similar to the thread color or is transparent is used. Despite only local adhesive centers, formed by the individual particles 7 being quasi provided here, a significant improvement in terms of adhesion or grip nevertheless results as compared to the non-populated knitted fabric part 1. When the applied quantity is increased, significantly more powder particles 7 are thus present on the thread or the individual loops, respectively. The particles 7 when heated likewise melt, but the individual melted particles 7 by virtue of the fineness form an optionally compact thread coating provided only within the individual stitch courses; a connection between the threads of the neighboring stitch courses does not take place even in the case of a higher pouring density of the fine powder particles 7.

Figure 4:
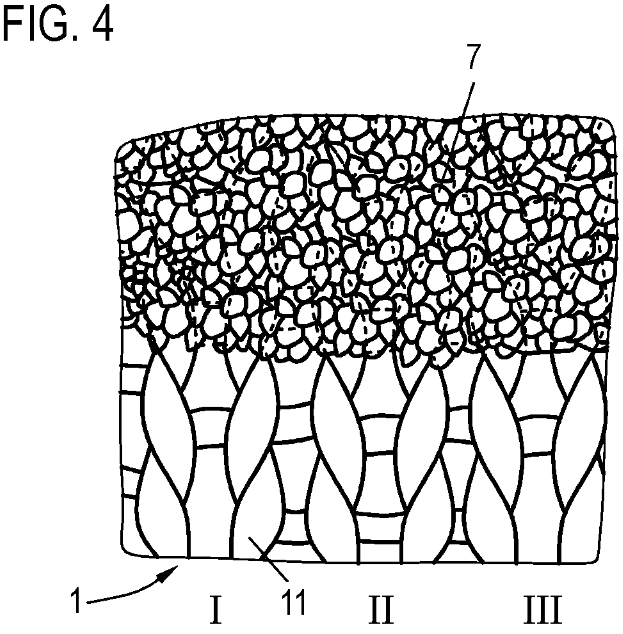
FIG. 4 shows a schematic diagram of a partial view of a knitted fabric corresponding to FIG. 2, having free-flowing, rough granular particles applied thereto, prior to the thermal treatment.
Figure 5:
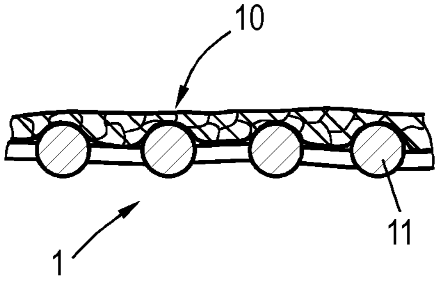
FIG. 5 shows a sectional view through the knitted fabric from FIG. 4, after the thermal treatment.
Figure 6:
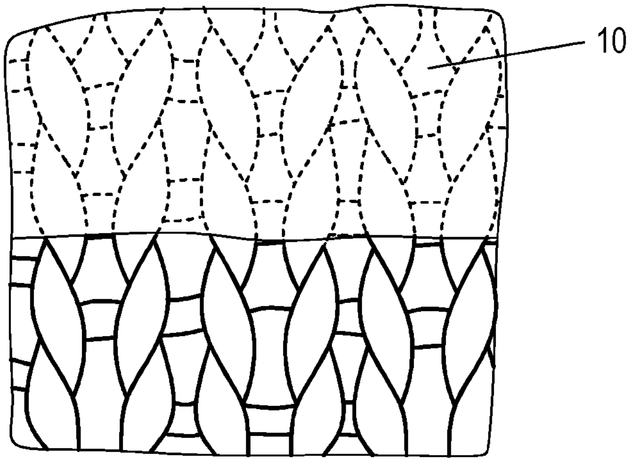
FIG. 6 shows a view from above onto the knitted fabric from FIG. 4, after the thermal treatment.

An example having a compact spanning coating is shown in FIGS. 4 to 6. The knitted fabric part 1 is again illustrated, here also composed of the individual thread 11, wherein a plurality of threads can also be used here. The three stitch courses I, II, III are shown again. The material here has also been sprinkled but not yet fused. Said material is applied only to the upper half of the knitted fabric, the lower half of the knitted fabric shown in the figure is not populated. The particles 7 shown here are formed by means of a significantly coarser powder or granulate; the pouring density is relatively high. By virtue of the size of the particles it arises that the particles 7 not only accumulate on the thread 11 but also close the intermediate spaces between the thread 11 or the stitch courses I, II, and III, respectively. When said knitted fabric part 1 is heated, the particles 7 are again melted, but by virtue of the high particle density a compact planar coating is formed, cf. the sectional illustration according to FIG. 5, said compact planar coating populating the knitted fabric 1 also so as to span the stitch courses I to III, cf. also FIG. 6. The coating 10, here in the form of an anti-slip installation, by virtue of the material 4 used is indeed an elastic, but the intrinsic elasticity of the knitted fabric 1 as a result of said planar coating is nevertheless modified at least in the respective region, this meaning that the force/elongation behavior in this region is different than in the purely textile area.

The material 4, or the particles 7, respectively, is/are, for example, a plastic or elastic polymer, for example a polyurethane, which melts at a temperature which does not compromise the properties of the thread or the threads, said polymer at room temperature however having adequate elastic properties and good haptic properties with a view to improving the grip or adhesion.

Figure 7:
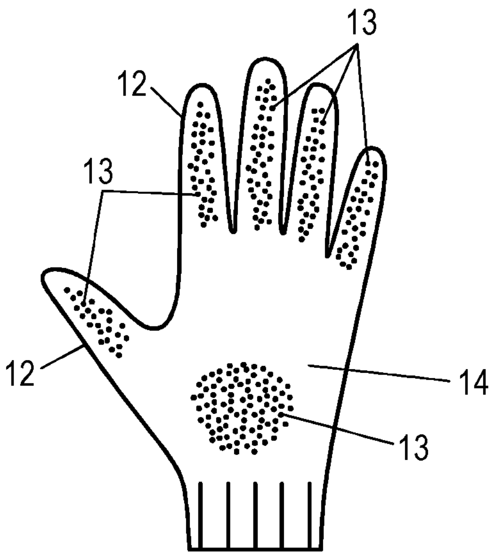
FIG. 7 shows a schematic diagram of a glove which on a plurality of regions on the external side is provided with a coating in the form of an anti-slip installation.

FIG. 7 shows a first example of a finished knitted fabric part 1 in the form of a glove, wherein respective regions 13 in the region of the individual fingers 12 are provided here with a local coating 10 in the form of an anti-slip installation, thus where respective material has been sprinkled and ultimately fused. A respective region 13 in which the coating 10 is configured is also provided in the region of the palm of the hand 14.

Figure 8:
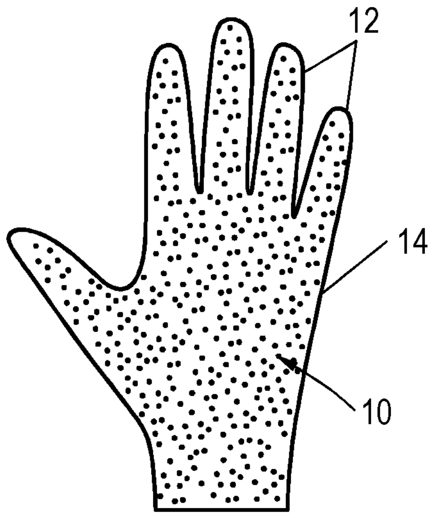
FIG. 8 shows a view comparable to that of FIG. 7, having a glove that is provided over a large area with a coating in the form of an anti-slip installation.

FIG. 8 likewise shows a knitted fabric part 1 in the form of a glove, wherein the glove internal side, thus the region of the palm of the hand 14 and the internal side of the fingers 12, herein by way of the sprinkled and fused powder or granulate is provided with the coating 10 in the form of an anti-slip installation in a fully planar manner, as is indicated by the dotted illustration.

Figure 9:
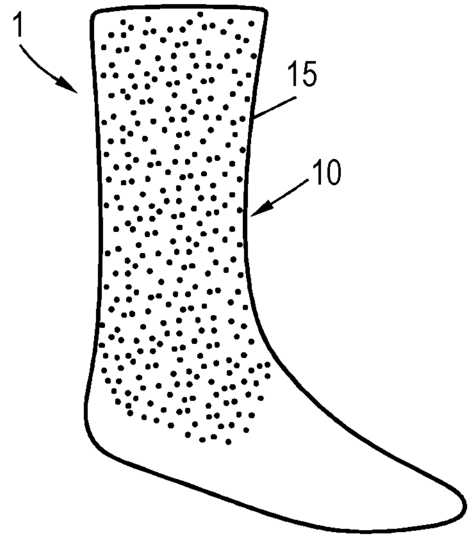
FIG. 9 shows a schematic diagram of a sock turned to the left side, that is to say turned inside out, having a coating over a large area.

FIG. 9 shows a knitted fabric part 1 in the form of a stocking which is shown here turned toward "the left", this meaning that the stocking external side or internal side is shown here. A large-area population by way of the coating 10 in the form of an anti-slip installation is provided, as indicated by the dotted illustration, said coating 10 being provided here only in the region of the stump 15 of the stocking.

Figure 10:
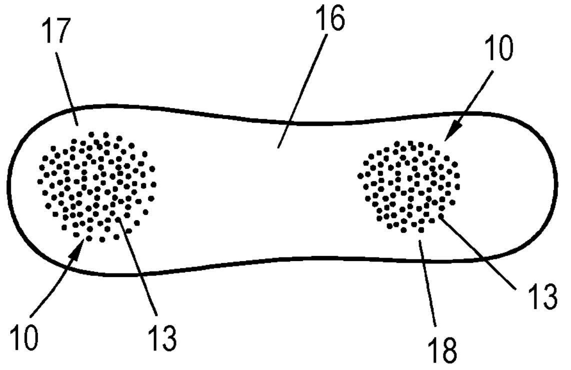
FIG. 10 shows the external side of the sole of the sock from FIG. 9, having a local coating in the form of an anti-slip installation.

FIG. 10 shows the external side of the stocking having the sole 16. This knitted fabric external side in the region of the heel 17 as well as in the region of the ball of the foot 18 is in each case provided with the coating according to the invention, or the anti-slip installation, respectively, as is indicated by the dotted illustration.

Figure 11:
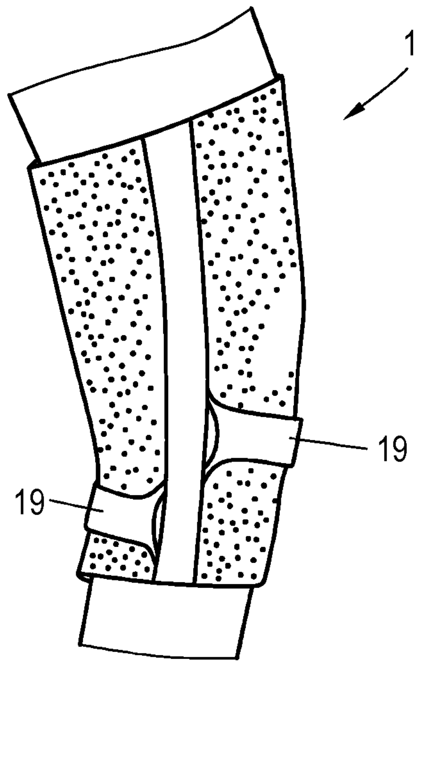
FIG. 11 shows a schematic diagram of a bandage having a coating in the form of an anti-slip installation.

FIG. 11 finally shows an exemplary embodiment of a knitted fabric part 1 in the form of a bandage, wherein said bandage, apart from the actual knitted fabric part 1, also has corresponding tensioning or traction means 19 so as to fix said bandage in a corresponding manner around the leg. While the knitted fabric external side is shown here, the dotted illustration indicates that the coating 10, here too an anti-slip installation, for example, again formed by way of the sprinkled powder or granulate, is configured on the knitted fabric internal side, thus on the side facing the skin of the leg, such that the correspondingly good adhesion is provided toward the leg.

Figure 12:
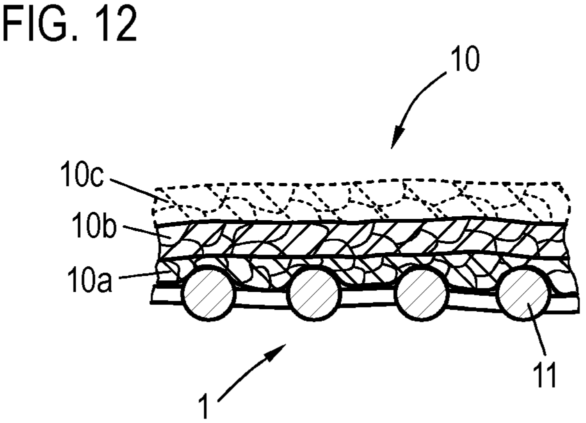
FIG. 12 shows a sectional view through a knitted fabric having a multi-layered coating construction.

FIG. 12 shows a sectional partial view of a knitted fabric part 1 having a coating 10 disposed thereon, said coating 10 here being embodied as a sandwich coating. Said coating 10 in the example shown is composed of a first coating layer or tier 10*a* from a first material, wherein said coating layer or tier 10*a* has been produced in the manner described above, thus in that a respective pulverulent material has been applied and subsequently heated. A second coating layer or tier 10*b* is applied to the first coating layer or tier 10*a*, likewise by sprinkling and subsequently heating a pulverulent or granular material, wherein the materials used in the two coating layers or tiers 10*a*, 10*b* are dissimilar such that the individual coating layers or tiers 10*a*, 10*b* are consequently imparted dissimilar mechanical properties. As is indicated by dashed lines, it is of course conceivable for a further or a plurality of further coating layers or tiers 10*c* to be applied in a corresponding manner so as to yet further enlarge or thicken the sandwich construction.

Alternatively to applying, or generating, respectively, individual and in each case heated coating layers or tiers, it is also conceivable for said coating layers or tiers to be produced by successive sprinkling of respective material tiers from the various powders or granulates, said material tiers then being collectively heated and melted or fused such that the respective sandwich composite results.

For example, by way of such a multi-layer construction it is conceivable for an elongation limitation to be effected by way of the inner coating layer or tier 10*a*, thus the coating layer or tier 10*a* that is close to the knitted fabric, while the outer coating layer or tier 10*b* is, for example, an adhesive layer which adheres to the skin, for example. On account thereof, a positive adhesion is achieved on the one hand, but any excessive elongation, for example as a pronation or supination protection or similar, is simultaneously also prevented on the other hand. Of course, other layer properties are also conceivable.

By way of such a multi-layered sandwich construction it is however also conceivable for correspondingly thick coating structures to be configured, so as to, for example, configure a correspondingly thick pad having a corresponding geometrical shape by applying a plurality of such layers. Said pad by virtue of fusing is fixedly connected to the knitted fabric part but in terms of the properties thereof can be set in a corresponding manner, for example by again using dissimilar material tiers.

Figure 13:
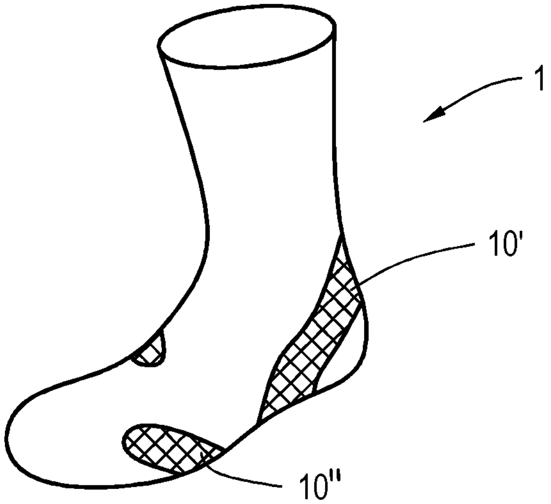
FIG. 13 shows a schematic diagram of a stocking having local tape-shaped or strap-shaped, relatively stiff coatings.

FIG. 13 shows a knitted fabric part 1 in the form of a stocking in which two tape-shaped or strap-shaped coatings 10' and 10" are provided. These two coatings 10', 10" are, for example, from a polymer which in the coated form is relatively stiff, consequently reducing the elasticity of the knitted fabric to which said two coatings 10', 10" are applied. This means that the knitted fabric part 1 is preferably stiffer in the longitudinal direction but also in the transverse direction of the tape-shaped or strap-shaped coatings 10', 10", and consequently cannot elongate or elongate only to a minor extent. On account thereof, a pronation or supination effect, respectively, or a corresponding protection, respectively, can be achieved since various mobility characteristics of the stocking and thus also of the foot on which the stocking is worn are restricted. Such a protective coating is expediently to be conceived somewhat thicker, for example by way of a sandwich structure described above, preferably when using identical materials in the individual coating layers or tiers.

Figure 14:
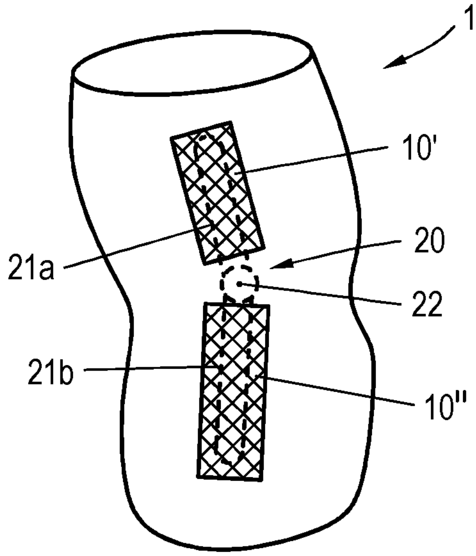
FIG. 14 shows a schematic diagram of a bandage having support coatings for a joint mechanism disposed thereon.

FIG. 14 finally shows a knitted fabric part 1 in the form of a bandage in which two coatings 10', 10" are in each case applied on the knitted fabric part external side in relation to the worn position on the leg external side and the leg internal side. The coatings 10', 10" are elongate and sufficiently rigid, thus from a corresponding, relatively non-elastic material. This is because said coatings 10', 10" serve as support coatings for fastening a joint mechanism 20 (shown here only in dashed lines) which by way of the two legs 21*a*, 21*b* thereof are in each case fastened to one coating 10', 10". The joint mechanism can be a plastics-material component; that means that the two legs 21*a*, 21*b* can be welded or fused, respectively, to the coatings 10', 10" by plastics-material welding. The two legs 21*a*, 21*b* are connected to one another in an articulated manner at an articulation point 22.

Since respective joint mechanisms 20 are provided on both sides of the knitted fabric part 1, an orthosis, which enables guiding of a movement, or limiting of a movement, respectively, of the knee which is encompassed by the knitted fabric part 1, can be formed on account thereof.

While specific embodiments of the invention have been shown and described in detail to illustrate the inventive principles, it will be understood that the invention may be embodied otherwise without departing from such principles.

I claim:

1. A method for producing a knitted fabric part which is a glove, a sock or a bandage and is knitted from at least one thread and which in at least one region on the knitted fabric external side and/or the knitted fabric internal side is equipped with a coating, wherein, for configuring the coating, a material comprised of individual particles is applied in the at least one region to the knitted fabric, said material subsequently being melted or fused by heating, whereupon the material is cooled to form the coating, wherein the material is applied in a quantity such that the particles of the material while forming a thread coating are bonded only to the threads without connecting the threads together.

2. A method according to claim 1, wherein the material is a powder or a granulate.

3. A method according to claim 1, wherein a plurality of tiers from dissimilar materials are applied, said materials for forming a multi-layered coating subsequently being melted or fused by collective heating, whereupon the materials are cooled to form the coating, or in that a further tier from another material is applied to a first coating layer, said other material subsequently being melted or fused by heating, whereupon the other material is cooled to form a further layer of the coating.

4. A method according to claim 3, wherein a second coating layer from a water-soluble material is applied to the first coating layer, whereupon a third coating layer is applied to the first and the second coating layer.

5. A method according to claim 1, wherein the material is applied by sprinkling.

6. A method according to claim 5, wherein the material is sprinkled only locally or is sprinkled on an entire surface of the knitted fabric external side or the knitted fabric internal side.

7. A method according to claim 6, including arranging a template to locally delimit the region or regions when sprinkling the material.

8. A method according to claim 5, wherein the knitted fabric part lies on a mesh and the material is sprinkled from above, wherein material sprinkled laterally beside the knitted fabric part is collected below the mesh.

9. A method according to claim 8, including suctioning of the material sprinkled beside the knitted fabric part.

10. A method according to claim 1, wherein the material is a thermoplastic or elastomeric polymer.

11. A method according to claim 10, wherein the polymer is a polyurethane.

12. A method according to claim 1, wherein the fabric part is: a glove, said glove at least on the inner external side of one or a plurality of knitted finger portions being provided with the coating; or a stocking, said stocking at least on the outside and/or the inside of the sole and/or in the region of the upper open stocking end on the inside being provided with the coating; or a bandage, said bandage at least in portions on the internal side or on the external side being provided with the coating.

* * * * *